Patented Jan. 16, 1934

1,943,919

UNITED STATES PATENT OFFICE 1,943,919

GRANULAR CALCIUM PHOSPHATE AND METHOD OF PRODUCING THE SAME

William H. Knox, Jr., Nashville, Tenn., assignor to Victor Chemical Works, Chicago, Ill., a corporation of Illinois No Drawing. Application September 19, 1931
Serial No. 563,889

5 Claims. (Cl. 23—109)

My invention relates to calcium compounds and more particularly to an improved method of producing mono-calcium phosphate.

The principal object of my invention is to produce mono-calcium phosphate that shall be relatively pure, hard, and mechanically resistant to abrasion.

Another object of my invention is to economically produce mono-calcium phosphate that shall be relatively free from impurities so that it may be utilized in the production of phosphate baking powders.

A further object of my invention is to provide a process for increasing the yield of granular mono-calcium phosphate obtainable which comprises incorporating a compound of an alkali metal in pure phosphoric acid and then reacting the acid with a suitable calcium compound such as calcium oxide or calcium carbonate.

In producing phosphate baking powders, mono-calcium phosphate is utilized which has been prepared by a reaction between lime and phosphoric acid. It is essential that the mono-calcium phosphate thus formed shall be pure, hard, and mechanically resistant, in order that after being subjected to a milling operation, it will yield the largest possible proportion of granular product suited for the manufacture of phosphate baking powder.

It has heretofore been the practice to produce commercial phosphoric acid by the chemical decomposition of a natural phosphate with sulfuric acid and then purifying the product. However, the phosphoric acid thus produced is contaminated by the presence of the phosphates of iron, aluminum, and other metals, which are not removed by the previously described chemical purification. In order to increase the purity of the phosphate utilized in baking powders, it has been found desirable to employ phosphoric acid in the manufacturing process which had been produced by the volatilization of a natural phosphate in a blast or electric furnace. The acid produced by this method is relatively pure but the mono-calcium phosphate produced therefrom is soft and of low resistance, and unadapted for the commercial production of a mono-calcium phosphate suitable for utilization in baking powders.

Because of its high purity, I prefer to employ phosphoric acid produced by the previously described volatization process in the manufacture of my improved phosphate. An analytical comparison of mono-calcium phosphates produced from phosphoric acid derived from both the acid decomposition process and from the volatilization process indicates that the acid derived from the latter process is superior for food purposes due to the lower percentage of impurities which it contains. For example, mono-calcium phosphates produced from phosphoric acid from acid decomposition of natural phosphates have been found from a large number of analyses to contain from 0.75% to 3% of iron phosphate, whereas the similar products derived from acids resulting from the volatilization processes contain a maximum of 0.50% of iron phosphate. A typical analysis of a mono-calcium phosphate derived entirely from volatilization acid contains 0.22% to 0.35% iron phosphate, 0.3% $Na_2O$, 0.2% $K_2O$, and 0.06 to 0.20% of $MgO$.

I have made the discovery that the hardness and resistance to abrasion of mono-calcium phosphate may be increased by incorporating a small amount of an alkali metal compound in the mono-calcium phosphate by methods hereinafter stated, thereby forming mono-calcium phosphate of the desired purity and hardness.

My researches upon this subject also indicate that the proportion of granular mono-calcium phosphate, produced by the reaction between phosphoric acid and lime, may be substantially increased by the addition of a sufficient amount of alkali metal salt to phosphoric acid to bring the sodium and potassium oxide content of the phosphate made therefrom to approximately 1 to 2%.

In practicing my invention, I preferably utilize the highly concentrated phosphoric acid prepared by the previously described volatilization method. To this acid after dilution, I may add a sufficient amount of an alkali metal compound such as sodium, potassium or ammonium carbonates, to bring the sodium and potassium oxide contents of the acid calcium phosphate subsequently made therefrom to about 1 to 2%. Preferably from 0.75 to 1.5% of sodium carbonate is so incorporated. The sodium compound is, it is believed, present as acid sodium orthophosphate in the final phosphate product. Instead of dissolving it in the acid, the alkali metal salt may be incorporated during the reaction between phosphoric acid and the lime to produce the mono-calcium phosphate. For example, a desired quantity of sodium carbonate or ammonium carbonate may be introduced directly into the reaction mixture.

The reaction is carried out in the usual manner by direct reaction of hydrated lime, quick lime, carbonate of lime or other suitable lime compound with diluted phosphoric acid obtained preferably by the volatilization process, the proportions of lime and added alkali metal compound being calculated to provide sufficient calcium and alkali metal to replace one hydrogen atom of each molecule of the phosphoric acid, sufficient of the alkali metal compound being incorporated to yield a phosphate having an alkali metal oxide content of from 1% to 2%. Thus in such a reacting batch, sodium carbonate or ammonium carbonate may be added during reaction in quantity to produce say 1% to 2% $Na_2O$ and $K_2O$ in the final product, the reaction continued in the usual way and the resulting phosphate concentrated and dried in any suitable manner, as by vacuum or spray drying.

A laboratory test of the approximate hardness and abrasive resistance of the phosphate may be made by milling the phosphate product for a fixed period of time, say 20 minutes, in a laboratory ball mill, suitably a one-quart size; screening the milled product, saving the portion passing through an 80 mesh screen and retained by a 100 mesh screen. The tailings are remilled until all pass the 80 mesh screen. The collected portions passing the 80 mesh screen and retained on the 100 mesh screen are again milled for 20 minutes and rescreened. The portion of the remilled material passing through an 80 mesh screen and retained on a 150 mesh screen, as compared with that portion passing through a 150 mesh screen may be regarded as an indication of the relative effectiveness of the manufacturing process for producing a granular calcium phosphate. This method does not indicate accurately the amount of the granular type of phosphate which will be produced in plant operation, but by utilizing a standardized method of manipulation, the figures obtained are found to have a definite relation to the proportions of granular phosphates secured in plant operation.

Employing the above described method of laboratory manipulation as an index, it has been found that a pure phosphoric acid derived from a volatilization process, and without the addition of alkali metal salts, of the 80–100 mesh portion from the first milling, approximately 33%, on the second milling, passed through the 150 mesh screen. In a second batch in which enough sodium carbonate had been incorporated to raise the $Na_2O$ content of the phosphate to approximately 1%, the portion of the same fraction passing through the 150 mesh screen after the second milling was reduced to about 20%. In a batch in which the $K_2O$ content was increased to approximately 1%, on similar treatment, after remilling the 80–100 portion obtained from the first milling operation, approximately 26% passed through the 150 mesh screen. With 16% $NH_3$, the proportion on remilling passing through the 150 mesh screen was 21.8%.

In the commercial operations, the method of handling the mono-calcium phosphate product and of separating the granular portions from the pulverized portions, is that which is customarily employed, the product being subjected to the usual milling operation and screening, the coarser products retained say on a 200 mesh sieve forming the granular product and the finer material, largely passing through the 200 mesh screen forming the regular product.

My improved process for the production of granular phosphates substantially increases the proportion of mono-calcium phosphate of the proper size and hardness formed. It is, therefore, especially suitable for employment under circumstances where undesirably low proportions of granular phosphate (say below 10% of the total) are formed in the manufacture of mono-calcium phosphate, as when substantial proportions of phosphoric acid from the volatilization processes are mixed with acid from the acid decomposition process. The incorporation of sufficient alkali metal compounds in phosphoric acid to bring the sodium and potassium oxide content of the phosphate made therefrom to approximately 1 to 2%, in accordance with this invention, also increases the hardness and abrasive resistance of the granular phosphate thus rendering it especially suitable for utilization as one of the ingredients of baking powder.

While I have described my invention in considerable detail, and have given specific examples, it will be understood that such examples should be construed as illustrative and not by way of limitation. Other modifications of my invention will be apparent to those skilled in the art without departing from the spirit and scope thereof. It is therefore, desired that only such limitations shall be imposed as are indicated in the appended claims.

I claim:

1. A mechanically resistant mono-calcium phosphate containing less than 0.5% iron phosphate, less than .2% MgO and with from 1 to 2% alkali metal oxide.

2. A mechanically resistant mono-calcium phosphate containing less than 0.5% iron phosphate, and with from 1 to 2% of sodium and potassium oxides.

3. The method of forming a mechanically resistant mono-calcium phosphate compound from purer forms of phosphoric acid low in metallic phosphates to increase the proportion of granular mechanically resistant product obtainable which comprises incorporating therein during manufacture a salt of an alkali metal so that the phosphate formed shall have an alkali oxide content of from 1 to 2%.

4. In the method of forming mono-calcium phosphate from purer forms of phosphoric acid, the step of increasing the proportion of granular, mechanically resistant product obtainable, which consists in reacting upon a lime compound with such phosphoric acid in the presence of a salt of an alkali metal in quantity to supply 1 to 2% of the oxide of the alkali metal in the final product.

5. The method of producing a mechanically resistant phosphate compound which comprises introducing a small amount of a salt of an alkali metal into phosphoric acid derived by the volatilization process, reacting on the acid with a calcium compound to form mono-calcium phosphate, the amount of salt of an alkali metal introduced being such as to form from 1 to 2% of the oxide of such salt in the final phosphate compound, concentrating the phosphate and then drying it.

WILLIAM H. KNOX, Jr.